United States Patent [19]

Meyer et al.

[11] Patent Number: 4,472,335

[45] Date of Patent: Sep. 18, 1984

[54] METHOD FOR PREPARING AN ANNULAR BODY OF A HYDRAULICALLY SETTING MASS

[75] Inventors: Adolf Meyer, Leimen-Lingental; Manfred Pfeifer, Wiesloch-Baiertal; Uwe Kraeft, Wiesloch, all of Fed. Rep. of Germany

[73] Assignee: Heidelberger Zement AG, Heidelberg, Fed. Rep. of Germany

[21] Appl. No.: 463,571

[22] Filed: Feb. 3, 1983

Related U.S. Application Data

[63] Continuation-in-part of Ser. No. 212,579, Dec. 3, 1980, abandoned.

[30] Foreign Application Priority Data

Apr. 12, 1979 [DE] Fed. Rep. of Germany ....... 2948638

[51] Int. Cl.³ ............................................. B32B 31/06

[52] U.S. Cl. ..................................... 264/70; 264/159; 264/166; 264/171; 264/312

[58] Field of Search ................. 264/166, 271, 70, 312, 264/310, 171, 259; 156/195

[56] References Cited

U.S. PATENT DOCUMENTS 3,740,291 6/1973 Mallard .............................. 264/310

FOREIGN PATENT DOCUMENTS 2743259 4/1979 Fed. Rep. of Germany .

*Primary Examiner*—John Parrish
*Attorney, Agent, or Firm*—Kurt Kelman

[57] ABSTRACT

Steel, cast iron, synthetic resin or concrete pipes are coated with a hydraulically setting mass, such as cement mortar or a mixture of cement, fibers, aggregates and optional additives, by entraining the mass before it has set from a storage container having two opposite walls moving at about the same speed, one of the container walls being formed by a portion of the circumferential wall of the pipe being rotated about its longitudinal axis and the opposite container wall being formed by a tensioned carrier band having one end affixed to the rotating pipe and the mass with the covering tensioned carrier band being wound around the rotating pipe.

19 Claims, 3 Drawing Figures

METHOD FOR PREPARING AN ANNULAR BODY OF A HYDRAULICALLY SETTING MASS

This is a continuation-in-part of U.S. application Ser. No. 212,579, filed Dec. 3, 1980 now abandoned.

The present invention relates to a method of preparing an annular body of a hydraulically setting mass. The annular body may be of circular or oval cross section and may form a tubular body, such as a pipe, or it may be a coating formed on such bodies. The hydraulically setting mass may contain aggregates and/or additives and may be fiber-reinforced.

It is known to provide pipes, tubular elements and armatures of steel, cast iron, synthetic resin, concrete or asbestos cement with corrosion-resistant coatings consisting of a hydraulically setting mass, such as cement mortar or mixtures of cement mortar and fibers.

It has been known to spray hydraulically setting masses on the outer surface of iron and steel pipes. This method has, however, a number of disadvantages. To assure proper adhesion of the coating to the outer surface, it must first be carefully cleaned in an expensive preliminary operation. To make spraying of the mass possible, furthermore, and to prevent the mass from gliding off the surface after spraying, the fresh mass must have certain properties which are disadvantageous after the mass has set. In addition, spraying causes some of the mass to rebound from the surface, which entails material losses and cleaning costs involved in removing the rebound mass. The surface of the sprayed coating is rough and its thickness non-uniform. The coated pipes can be stacked only after the mass has hardened.

It has been found that even very careful operations did not produce the desired quality of hydraulically setting coatings. Not only was the coating procedure difficult but the density and adhesion of the coatings to the substrate have been unsatisfactory. Shrinkage of the set hydraulic mass can cause cracks in the coating, which diminishes the corrosion protection.

Published German patent application No. 2,743,259 discloses a method for coating metal pipes which is supposed to eliminate difficulties of adhesion of the coating to the pipe surface. According to this method, a corrosion-resistant mass of cement mortar or a mixture of cement mortar and fibers is applied to the outer metallic surface of a pipe and, after the corrosion-resistant coating has been applied to the metallic surface, a bandage is wound thereabout. The mass itself is applied to the surface by spraying and the problems resulting therefrom are not eliminated by the subsequent application of a bandage around the sprayed mass. The metal surface still requires suitable preparation to enable the sprayed mass to adhere thereto properly. The uniformity of the coating thickness still is problematic. The sprayed mass cannot be densified. All the bandaging prevents is a subsequent detachment of the coating from the metal surface, the winding of the sheet material around the coating being effected in a manner generally known from other winding procedures, such as disclosed in accepted German patent specification No. 1,278,899.

U.S. Pat. No. 3,740,291 discloses an apparatus for applying a coating under compression to a tubular member which is being rotated and moved along its longitudinal axis adjacent the apparatus. The apparatus comprises a funnel-like storage container placed with its lower open end on the upper side of the tubular member.

The storage container includes two side wall members and coating material is deposited onto the rotating tubular member therebetween. An outer wall member is pivotally mounted with the side wall members and is movable relative thereto to a position determining the thickness of the coating material which is compressively wrapped against the rotating tubular member with a strip of tensioned wrapping material to form a covered coating layer on the tubular member. The patented apparatus requires a side guide member formed of a slight helical taper of one blade of the storage container to provide a channeling or funneling action and convey and assist in compacting the coating mass. The coating must have a thickness of at least 50 mm and it must be reinforced with a reinforcing wire mesh. The storage container is rigidly attached. A uniform thickness and homogenity of the coating is not guaranteed.

It is the primary object of this invention to improve the method of coating an annular body with a hydraulically setting mass, such as coating a core or a shaped body of circular or oval cross section, so that the mass will be applied in a simple manner and without losses in an essentially uniform thickness and a desirable density while adhering strongly to a surface without preparation thereof, and the set mass will have a structure of such homogeneity and stability that it may be a self-supporting shaped body when the underlying core is removed.

It is a preferred object of this invention to coat a pipe, preferably an iron or steel pipe, with a highly corrosion protective coating of a hydraulically setting fiber-reinforced mass. It is another object of this invention to provide a method for coating an annular body with a hydraulically setting mass to form a uniform and rather thin coat of high strength.

The above and other objects are accomplished according to the invention with a method of coating a circumferential wall of an iron or steel pipe with a hydraulically setting wet mass, which comprises the steps of affixing an end of a tensioned carrier band to the pipe wall and rotating the pipe about a longitudinal axis thereof whereby the carrier band is wound around the pipe wall. A funnel-shaped storage and delivery container is formed and arranged between a portion of the pipe wall and the carrier band laterally of the pipe, the wall portion and the carrier band constituting two opposite walls of the storage and delivery container moving at about the same speed, and the carrier band constituting the container wall is supported in the range of the container. The coating mass is first mixed without fibers and, shortly before introducing the wet mass into the container, fibers are added thereto and thoroughly mixed and uniformly distributed in the mass until the mass attains a felt-like structure. The mass having a felt-like structure is introduced into the funnel-shaped container before it has set, the mas is entrained from the container by the force of gravity through a discharge slot defined between the opposite container walls, and the entrained mass is applied to the pipe wall in strips of the desired thickness while the pipe is rotated and the opposite container walls are moved whereby the applied mass and the tensioned carrier band are wound over and around the pipe wall. The fibers are oriented and aligned in the coating mass while the mass is entrained through the discharge slot and the coating mass is applied to the rotating pipe wall under the pressure of the tensioned carrier band to densify the mass. The mass is subsequently set on the pipe wall.

The apparatus for carrying out this method comprises a circumferential wall of an iron or steel pipe rotating about a longitudinal axis thereof, a storage roll of a carrier band having one end affixed to the pipe wall whereby the carrier band is tensioned and wound around the pipe wall during rotation of the pipe, a guide member supporting the carrier band adjacent a portion of the pipe wall and laterally thereof, the wall portion and the supported carrier band constituting two opposite walls of a funnel-shaped storage and delivery container for a wet hydraulically setting mass containing uniformly distributed fibers to form a felt-like structure, a lower edge of the guide member and the pipe wall portion defining a discharge slot for the wet mass between the two opposite walls of the container, and means for mounting the container yieldingly and movable in relation to the pipe so that the size of the discharge slot may be held at a constant width during the coating.

In the preferred embodiment of the invention, the size of the discharge slot for the coating mass is adjustable to assure that the coating applied to the pipe has essentially a uniform thickness around the circumferential wall of the pipe.

The path of the mass entrained by the moving carrier band and thus the storage and delivery container is laterally delimited by fixed lateral walls.

Three embodiments of an apparatus for carrying out the method according to the invention are illustrated in the drawings. In the drawing, FIG. 1 is a schematic perspective view of one embodiment;

FIG. 4 shows a third embodiment.

The figures illustrate how the method is carried out. Generally, carrier band 8 or 8*a* is wound with coating mass 7 or 7*a* around pipe R or R*a*. The carrier band is unreeled from a roll and, optionally, it is additionally tensioned with a roller.

Figure 1:
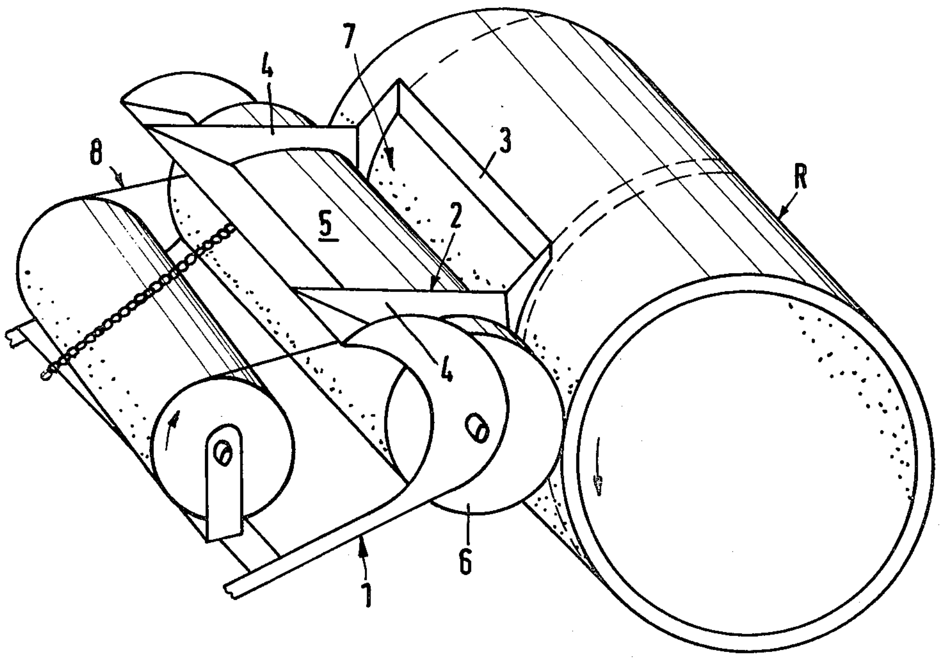
Figure 2:
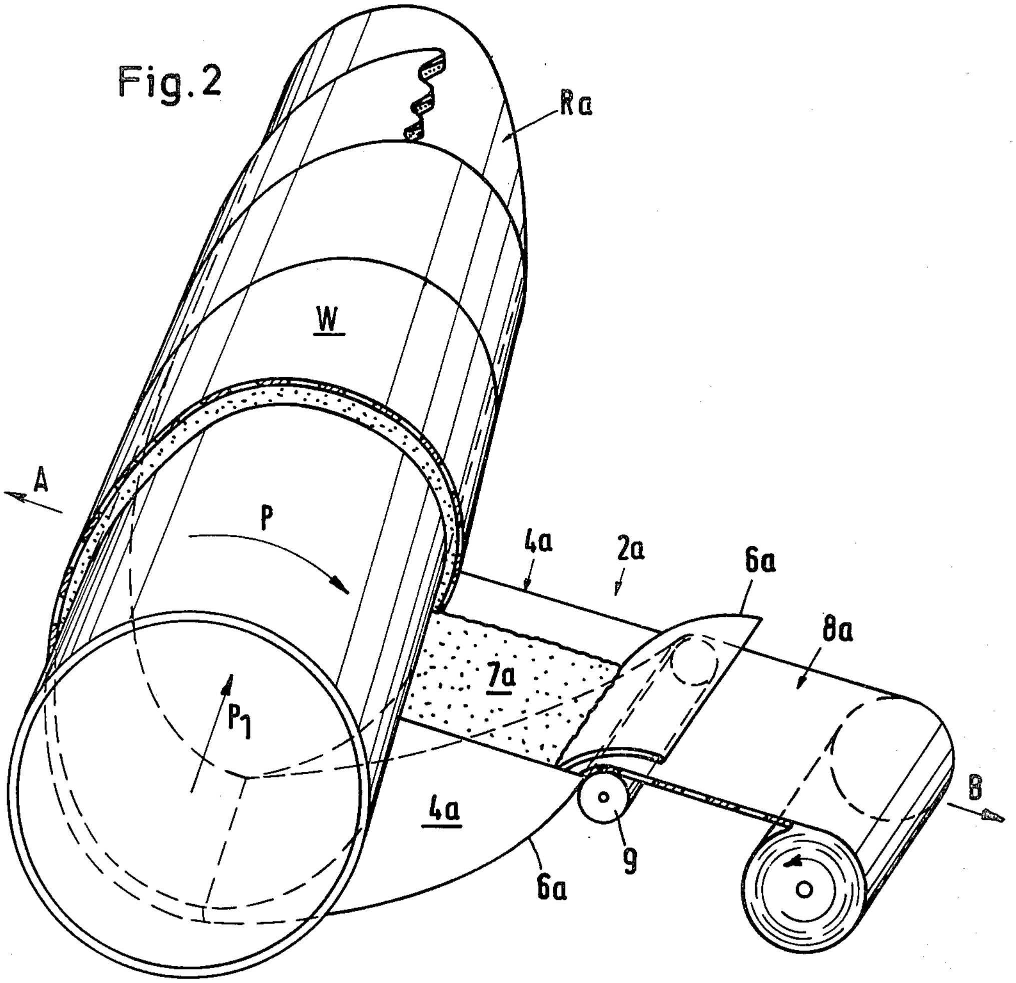
FIG. 2 is a schematic perspective embodiment of a second embodiment, with a pipe partially carrying a spiral winding.

The apparatus shown in FIG. 1 comprises a frame-like support 1 which has, on the side facing rotating pipe R to be coated, an exchangeable, through-shaped attachment forming a funnel-like storage and delivery container 2 and roller 6 below the attachment. Container 2 is comprised of side walls 4, 4 and a rear wall which is constituted by portion 5 of the circumferential surface of roller 6. Container 2*a* of the embodiment of FIG. 2 is comprised of side walls 4*a*, 4*a* and its rear wall is constituted by metal guide sheet 6*a*. These three walls (side walls 4,4 and rear wall 5, FIG. 1 or side walls 4*a*, 4*a* and rear wall 6*a*, FIG. 2) form a guide device for carrier band 8 or 8*a* and for coating mass 7 or 7*a*.

The end of the storage and delivery container 2 or 2*a* acing pipe R (FIG. 1) or Ra (FIG. 2) is open. This open end is closed in the two embodiments by a portion of pipe R or Ra when the container 2 or 2*a* is placed adjacent pipe R or Ra in the operating position. Preferably, this open end of the container is delimited by web 3 (FIG. 1) which connects the upper edge of the two opposite wide walls 4, 4 of attachment 2.

Figure 3:
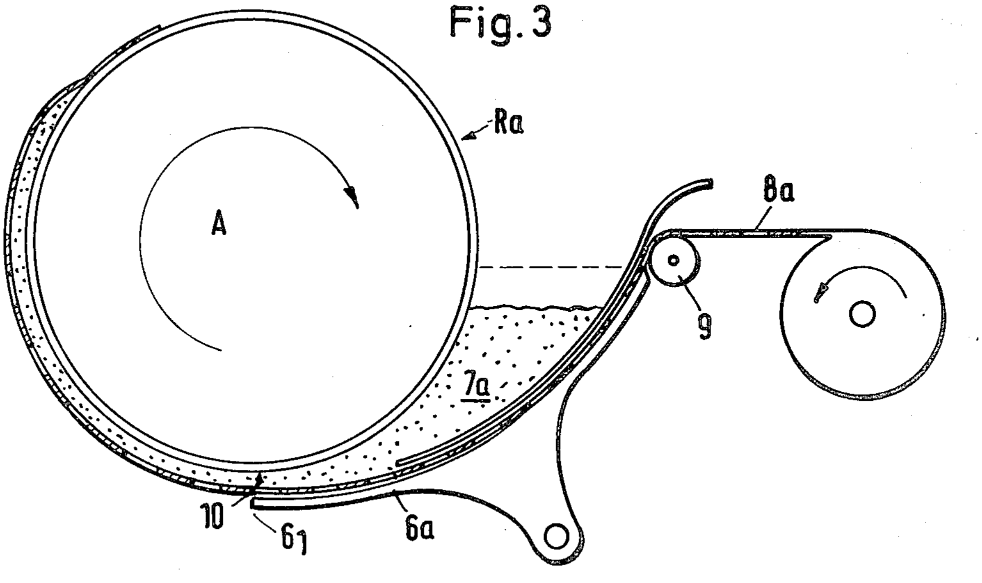
FIG. 3 is a transverse section along line A-B in FIG. 2.

Carrier band 8 or 8*a* is drawn from a roll and, optionally, is guided over guide roller 9 (FIGS. 2, 3) at the rear wall of the funnel-like container 2*a*. The free end of carrier band 8 or 8*a* is fixed on pipe R to be coated by a connecting piece (not shown).

The portion of carrier band 8 or 8*a* resting on the rear wall of the storage and delivery container 2 or 2*a* for coating mass 7 or 7*a* constitutes a traveling, i.e. an advancing wall of the storage container. The second advancing wall of the storage container is located opposite the traveling carrier band and is constituted by the portion of the circumferential wall of pipe R or Ra which is adjacent the container 2 or 2*a*. The distance of roller 6 or the lower edge $6_1$ of the metal guide sheet 6*a* from piper or Ra to be coated defines a discharge slot 10 for the coating and determines the thickness of the coating applied to pipe R or Ra.

The roller 6 is driven, rotates freely or is stationary.

A controllable vibrator 11 (FIG. 4) is preferably arranged on container 2*a*. A steady flow of the mass is made possible by the use thereof, the mass being fluidized and densified by the vibration and being guided directly to the circumferential wall of the pipe to be coated. A predensification may be effected in the storage and delivery container by an internal vibrator (not shown) so that air bubbles are avoided between the surface of the tube and the coating mass.

FIG. 2 shows pipe Ra which rotates in the direction of arrow P and moves in the direction of arrow $P_1$ axially, that is reciprocatingly, while it is wound about by coating mass 7*a* and carrier band 8*a* in the form of windings W. This type of movement is not absolutely required. The pipe as well as the storage container may be axially moved during the coating of pipe R (FIG. 1) or Ra (FIG. 2).

It is an essential characteristic of the storage and delivery container that the two opposite walls which interconnect the lateral parts of the container are not stationary but move in the same direction in the operating position of the container or the operation of the apparatus. During this movement, the coating mass is entrained out of the container by the surface portion of the pipe which is to be coated and which forms the wall of the container, adheres to the surface of the pipe and is pressed thereagainst by the carrier band (rear wall of the storage and delivery container) moving in the same direction.

In this apparatus, it is particularly advantageous to flare the container upwardly so that large and sufficient amounts of coating mass may be introduced therein. This will preclude inhomogeneities.

FIG. 4 schematically illustrates an embodiment of the apparatus of this invention wherein storage and delivery container 2*a* is yieldingly adjustably mounted so that discharge slot 10 may be held at a constant (and adjustable) width with respect of the circumferential wall of pipe Ra during the entire coating procedure. In the illustrated structure, lower edge $6_1$ of metal guide sheet 6*a* (see FIG. 3), which cooperates with the adjacent portion of the pipe wall to delimit the discharge slot, is movable in relation to pipe Ra so that the size of discharge slot 10 may be held at a constant width. The metal guide sheet is supported on linkage L one of whose ends is linked to support platform 12 while its other end is linked to the metal sheet guide member 6*a* so that this guide member of the storage and delivery container may be moved over a limited path in a vertical and horizontal direction.

In the illustrated embodiment, the linkage comprises push rod 13 linked to platform 12 at pivot X at a lower end of the push rod while its upper end is linked at pivot 13*a* to generally horizontal lever strut 14, pivot 13*a* dividing the lever strut into lever arms 14*a* and 14*b*. Lever arm 14*a* is an angle lever linked at pivot 15 to the underside of metal sheet guide member 6*a* of the container at a distance from the lower edge of member 6*a*. Linkage L, with its three pivots X, 13*a* and 15, enables the funnel-like container to make limited vertical and horizontal movements so that the position of the lower edge 6, relative to pipe Ra is held at a constant distance. Both moving paths are limited by a yielding support of the links of linkage L, illustrated as shock absorbers 16 and 18. These shock absorbers may be coil springs, pressure fluid operated jacks, i.e. hydraulic or pneumatic jacks, or the like yielding supports. Yielding support 16 is mounted between lever arm 14*b* and guide member 6*a* while yielding support 18 is arranged between push rod 13 and platform 12. The tensile force of the yielding supports as well as the links of linkage L are so dimensioned and arranged in relation to each other that they suitably delimit the moving paths of the guide member.

To enable discharge slot 10 for coating mass 7*a* to be maintained during the coating process according to the contour of the surface of pipe Ra and to maintain its size at least substantially uniform with respect to the pipe, adjusting roll 17 is provided, for instance, at the lower edge of sheet metal guide member 6*a* of container 2*a*. The rotary axis A1 of this adjusting roll extends parallel to rotary axis A of pipe Ra and in the mentioned position its radius corresponds to the size of discharge slot 10. Preferably, adjusting roll 17 is mounted immediately at the lower edge of the guide member which determines the width of the discharge slot. When container 2*a* is in operating position, the circumference of rotary adjusting roll 17 runs on the circumferential wall of the pipe in the portion thereof forming one of the opposite walls of container 2*a* and not yet coated with the wet mass. However, if desired, the adjusting roll may also be spaced from the lower edge of the guide member. Therefore, the selection of the diameter of roll 17 and its mounting position at the delivery container will determine the thickness of the coating on pipe Ra. The adjusting roll is replaceably mounted to make different selections of the coating thickness possible.

Adjusting roll 17 follows every unevenness or eccentricity of the circumferential wall of pipe Ra to be coated and takes along lower edge $6_1$ of guide member 6*a* of container 2*a* as it follows the pipe wall on which it runs. In this manner, the width of discharge slot 10 is regulated in accordance with the actual contour of the pipe wall and, therefore, a uniform coating thickness over the entire circumference of the pipe is assured. Linkage L, with its yielding supports 16 and 18, provides a yielding, yet firm mounting of the storage and delivery container for the wet mass.

It is essential how the fibers are introduced into the coating mass. For this reason, the hydraulically setting mass is first mixed without fibers to form the matrix of the coating. The fibers are added to the wet pre-mixed matrix of the coating mass shortly before this mass is introduced into the funnel-like delivery container. The fibers are thereby thoroughly mixed with and uniformly distributed within the wet coating mass to form a felt-like structure giving the mass sufficient strength for a uniform and homogeneous coating without the need of an additional reinforcing mesh or other reinforcing element. The mass is stabilized by the fibers so that it does not move out of the path when it is entrained and applied to the rotating pipe to be coated. It has been found that an amount of fibers as little as 2 vol.-% or even less is sufficient to obtain an excellent coating mass and accordingly an excellent coating with outstanding corrosive protection. This was unexpected and surprising. With the coating mass of the invention it is possible to apply coatings having a thickness of a few mm only, which have excellent strength and excellent protective properties. The fibers impart to the mass a "microreinforcement." The preferred fiber diameter is about 10u.

Such a fiber-reinforced, hydraulically setting coating mass processed with an apparatus as described wets and thereby cleans a portion of the circumferential wall of the rotating pipe before it has set and before the actual coating of the pipe wall begins. During the entrainment and discharge of the coating mass through the discharge slot of the funnel-like container, the fibers within the mass are oriented and the mass itself is densified. The effectiveness of the fibers is thereby enhanced. Furthermore, the mass may be deaerated in the storage container and accordingly further densified. The almost pore-free coating produced thereby also adds substantially to the strength of the adhesion of the coating. Therefore, a prior preparation of the pipe surface, such as sand blasting of steel or cast iron pipes, is usually not required. Furthermore, variations in the consistency of the mass make no difference in this method because the tensioned carrier band may serve as a lost form after it has served as one of the moving walls of the storage and delivery container and is wound about the pipe and applied mass. In addition, the method carried out with the container automatically takes into account local unevennesses of the pipe surface and operates at pipe bends or if the pipe cross section is oval instead of circular. This because of the movably mounted delivery container, enabling the automatic size adjustment of the discharge slot. Further, the container also serves as a buffer in the delivery of the hydraulic mass and thus facilitates the continuous delivery of the mass to the coating operation.

The discharge slot for the mass at the lower end of the delivery container is defined, on the one hand, by an edge of the guiding member for the carrier band and, on the other hand, by the portion of the circumferential wall of the pipe opposite the guiding member edge, i.e. by the distance of the guiding member edge from the pipe surface. This distance and the corresponding thickness of the applied mass may be adjusted, as desired, simply by moving the guiding member edge closer to, or farther from, the pipe wall. The movably mounted portion of the funnel-like container enables an automatic adjustment of the size of the discharge slot of the storage container. At the discharge slot, the coating mass and the moving walls of the container have the same speed and the fluid mass is applied to the circumferential wall of the rotating pipe in the desired width and thickness. It is, in other words, applied to the wall as the pipe turns about its axis and entrains the carrier band whose one end is affixed to the turning pipe. The mass is entrained from the storage container by the force of gravity, the rotating pipe and the moving carrier band, and is drawn out of the discharge slot onto the pipe wall. After the mass has left the discharge slot, the tensioned carrier band supeposed over the flowing mass causes the mass to be pressed against the pipe surface and to be affixed thereon.

Since this method permits the application of the fluid hydraulic mass rapidly and without problems, it is possible to use fast-hardening masses as well as normally hardening masses. Contrary to conventional opinion of those skilled in the art, the described method makes it possible to roll a hydraulically setting mass in its fluid state onto the circumferential wall of a rotor. The gap between the rotor surface and the rolling device, i.e. the guide for the carrier band, determines in this case the thickness of the applied coating.

In general, the fibers used are alkali-resistant fibers, preferably glass-fibers.

For example, in the case of glass fiber-reinforced concrete, the fibers dispersed in the concrete mass are somewhat aligned in the storage container during vibration thereof for the densification and deaeration of the mass, and the fibers are then oriented to a substantial extent as the mass is drawn out of the discharge slot of the storage container by the moving walls thereof. This produces optimal resistance to cracking and thus enhances the quality of the coating. The coating obtained with the method of the invention has a rather high impact strength of about 7.5 $kJ/m^2$, whereas a coating prepared by a conventional method using normal concrete has an impact strength of about 2.5 $kJ/m^2$.

Experiments have shown that an annular body produced in accordance with the method of this invention is extraordinarily homogenous, very dense and of high stability. It is self-supporting if the pipe is removed after the mass has set. Thus, if the circumferential pipe wall is covered before application of the hydraulically setting mass with a separating medium so that the mass will not adhere to the wall during setting, the pipe can be used as a removable core and the annular body formed thereon will be a self-supporting tube. On the other hand, if the mass adheres to the pipe wall during setting, it will form a coating on the pipe, particularly iron or steel pipe.

The carrier band may be guided with an edge strip projecting from a longitudinal side thereof and not covered by the mass whereby the edge strip overlaps a preceding winding of the carrier band as it is wound about the mass applied to the rotor. The overlapping edge strips of successive windings of the carrier band may be bonded together so that the wound carrier band forms an airtight envelope around the coating.

It is also possible for successive windings of the applied mass and carrier band to form thickened overlapping joints, as the mass passes out of the discharge slot, and these joints are subsequently planed to provide an annular body of uniform thickness.

The carrier band may be used as an outer form for, and detachable from, the annular body or it may be a permanent outer form therefor, and a bonding agent may be positioned between the carrier band and the mass for enhancing adhesion of the band to the mass if the carrier band is to be used as a permanent outer form.

The carrier band may be made of any suitable sheet material and may be an impermeable film to prevent undue drying of the mass. The sheet material may be fiber-reinforced to enhance the tensile and impact strength thereof. It may also be a net or a felt-like sheet.

The rotor may be continuously axially moved during rotation for spirally winding the carrier band with the applied mass around the rotor or it may be discontinuously axially moved during rotation for winding the carrier band with the applied mass in closed rings around the rotor. The rotor may be supported for rotation about its longitudinal axis at respective ends thereof or, if a tubular body, it may be mounted for rotation on rollers. If spiral winding of the carrier band and the mass is desired, the band and the mass are guided obliquely to the rotor at an angle depending on the rotary and axial speed of the rotor.

If desired, a plurality of coatings may be applied to the rotor by the described method in successive stages to provide a laminated coating.

What is claimed is:

1. A method of coating a circumferential wall of an iron or steel pipe with a hydraulically setting wet mass, which comprises the steps of affixing an end of a tensioned carrier band to the pipe wall, rotating the pipe about a longitudinal axis thereof whereby the carrier band is wound around the pipe wall, forming and arranging a funnel-shaped storage and delivery container between a portion of the pipe wall and the carrier band laterally of the pipe, the wall portion and the carrier band constituting two opposite walls of the storage and delivery container moving at about the same speed, supporting the carrier band constituting one of the opposite container walls in the range of the container, first mixing the coating mass without fibers and, shortly before introducing the wet mass into the container, adding fibers thereto, thoroughly mixing and uniformly distributing the fibers in the mass until the mass attains a felt-like structure, introducing the mass having a felt-like structure into the funnel-shaped container laterally of the pipe before it has set, entraining the mass from the container by the force of gravity through a discharge slot defined between the opposite container walls, applying the entrained mass to the pipe wall in strips of a thickness determined by the discharge slot while the pipe is being rotated and the opposite container walls are moved whereby the applied mass and the tensioned carrier band are wound over and around the pipe wall, the fibers are oriented and aligned in the coating mass while the mass is entrained through the discharge slot and the coating mass is applied to the rotating pipe wall under the pressure of the tensioned carrier band to densify the mass, and subsequently setting the mass on the pipe wall.

2. The method of claim 1, wherein the fibers arepresent in the coating mass in the range of about 2 vol.-%

3. The method of claim 1, wherein the fibers are alkali-resistant fibers.

4. The method of claim 1, wherein the coating mass is applied to the pipewall in a thin layer having a thickness of the order of a few millimeters.

5. The method of claim 1, wherein the container is movably mounted and comprising the steps of adjusting the discharge slot during the application of the mass to the rotating to follow the contours of the circumferential wall so that the size of the discharge slot is maintained constant with respect to the wall during the coating procedure.

6. The method of claim 1, wherein the hydraulic mass is deaerated by vibration in the container before it is applied.

7. The method of claim 1, wherein the pipe is continuously axially moved during rotation for spirally winding the carrier band with the applied mass.

8. The method of claim 7, wherein the carrier band is guided to the pipe at an angle depending on the rotary and relative axial speed of the pipe.

9. The method of claim 1, wherein the pipe is discontinuously axially moved during rotation for winding the carrier band with the applied mass in a closed ring.

10. The method of claim 1, wherein the carrier band is guided with an edge strip projecting from a longitudinal side thereof and not covered by the mass whereby the edge strip overlaps a preceding winding as it is wound with the mass around the pipe.

11. The method of claim 1, wherein the carrier band is used as an outer form for, and detachable from, the applied mass.

12. The method of claim 1, wherein the carrier band is of an impermeable sheet material.

13. The method of claim 12, wherein the impermeable sheet material is fiber-reinforced to enhance the tensile and impact strength of the material.

14. The method of claim 1, wherein the carrier band is used as a permanent outer form for the applied mass and a bonding agent is positioned between the carrier band and the mass for enhancing adhesion of the band to the mass.

15. The method of claim 1, wherein successive windings of the applied mass and carrier band form thickened overlapping joints, and further comprising the step of planing the thickened joints.

16. The method of claim 1, wherein the carrier band is supported in the range of the storage container by a rigid guiding device tangentially adapted to the pipe wall.

17. The method of claim 1, wherein the carrier band is supported in the range of the storage container by a cylindrical guiding device adapted to the pipe wall.

18. The method of claim 17, wherein the cylindrical guiding device is stationary.

19. The method of claim 17, wherein the cylindrical guiding device is movable.

* * * * *